(No Model.)
J. WEAR.
Guide for Stamp Mills.
No. 240,627. Patented April 26, 1881.
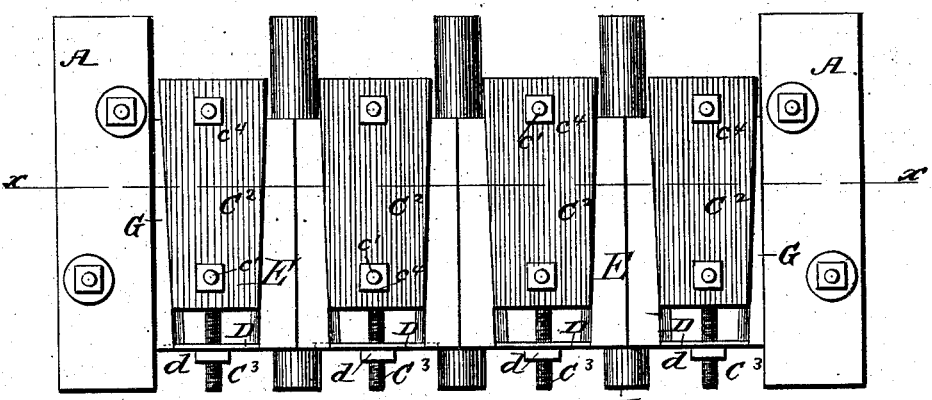
Fig. 1.
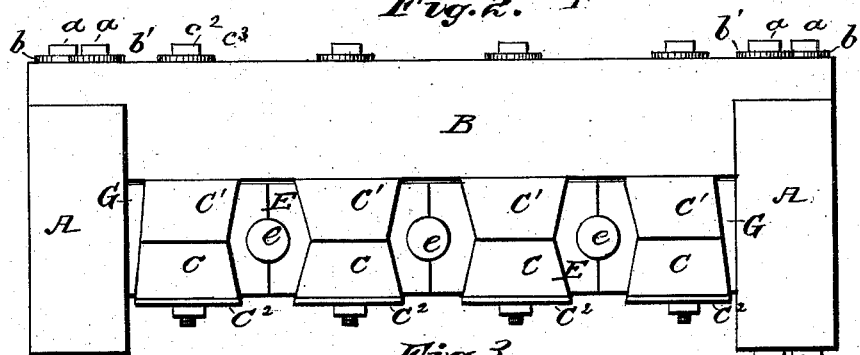
Fig. 2.
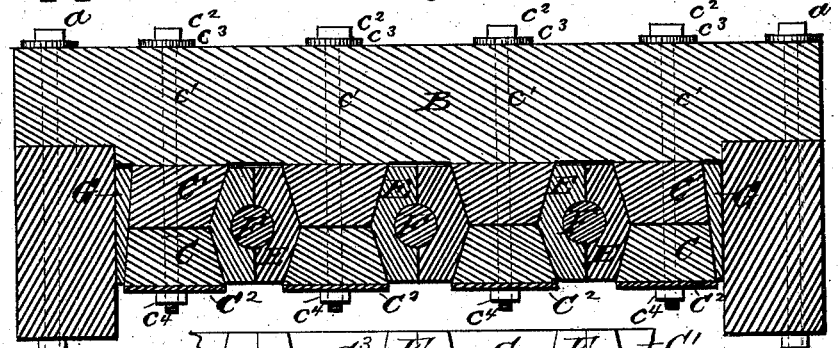
Fig. 3.
Fig. 4.
Witnesses:
Inventor
Joseph Wear
Per C. A. Watson
Attorneys.

UNITED STATES PATENT OFFICE.

JOSEPH WEAR, OF PARK CITY, UTAH TERRITORY.

GUIDE FOR STAMP-MILLS.

SPECIFICATION forming part of Letters Patent No. 240,627, dated April 26, 1881.

Application filed August 23, 1880. (No model.)

*To all whom it may concern:*

Be it known that I, JOSEPH WEAR, of Park City, in the county of Summit and Territory of Utah, have invented certain new and useful Improvements in Guides for Stamp-Mills; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to an improvement in guides for stamp-mills; and it consists in the construction and arrangement of parts, as will be hereinafter more fully set forth, and pointed out by the claims.

In the annexed drawings, Figure 1 is a side elevation; Fig. 2, a plan view; Fig. 3, a section on line $x\,x$, Fig. 1. Fig. 4 is a detail.

A A represent the battery-posts, which are permanently and firmly secured to the ground in any suitable manner.

B is the guide-rail, which is suitably attached to the battery-posts by means of bolts $a$ and nuts and washers $b\,b'$.

C C' are the sectional bearings, preferably made as shown, whose inner surfaces are so beveled as to meet in a center line, and they are also made tapering from bottom to top, to form a seat for the wooden bushing. They are secured to the guide-rail B by means of guide-bolts $c'$. Said bolts are also provided with washers and nuts $c^2$ and $c^3$.

$C^2$ are the iron plates, which are made the exact shape of the sectional bearings C C', and are fitted upon the outer surfaces of the same, and serve the purpose of a washer, and also to strengthen said bearings. They are secured to the bearings by means of guide-bolts $c'$ and nut $c^4$.

$C^3$ is the eyebolt, which is let into the shoulder $c^5$ upon the inner surfaces of the bearings C, and serves to secure the wooden bushing. Upon this eyebolt $C^3$ is placed an anchor-plate, D, which is secured upon said bolt by means of a nut, $d$.

E E are the wooden bushings, whose outer surfaces or sides are so beveled as to fit into the groove or seat formed by the bearings C C'. Their inner surfaces or sides have semicircular openings of a suitable size, which, when these bushings are placed in position, form the bearing $e$ for the stamp or stamping-rod F.

G G are the wooden keys, which are made both beveled and wedge-shaped. By this construction these keys are made to fit between the battery-posts and the outer sectional bearings, C C'. They serve to give a starting-point for the anchor-plates, and also to occupy any space left between said battery-posts and the outer bearings caused by shrinkage of the former, and also to strengthen the latter. By this arrangement the bushing may be easily renewed without necessitating the taking off of a single nut; but by simply loosening the same it will admit of the turning of the anchor-plate which holds the bushing.

When the anchor-plates D are in proper position their ends rest in recesses $c^6$ formed in the top of the bushings E, and being held firmly by the nuts $d$ on the bolts $C^3$, they thus serve to prevent the bushings from being lifted out of place by the friction of the stems F. The sectional bearings C C' and anchor-plates D are so arranged that they support and hold half of the bushings of each of the two stems running on either side of them. The bushings are so made that when worn by friction, so as to give too much play to the stems, they may be readily taken out and their inner meeting surfaces dressed down, thereby reducing the size of the opening $e$, and causing the bushing to again fit tightly around the stem.

Having thus described my invention, what I claim as new, and desire to secure by Letters Patent, is—

1. The combination of the sectional bearings C C', bushings E, eyebolts $C^3$, anchor-plates D, and nuts $d$, all constructed and arranged substantially as and for the purpose specified.

2. The combination, with the battery-posts A A, guide-rail B, and beveled keys G G, of the bushings E E and sectional bearings C C', having eyebolts $C^3$, anchor-plates D, and nuts $d$, substantially as set forth.

In testimony that I claim the foregoing as my own I have hereto affixed my signature in presence of two witnesses.

JOSEPH WEAR.

Witnesses:
FRED. T. DEANE,
PETER KIRKWOOD.